(12) United States Patent
Ghasemi et al.

(10) Patent No.: US 11,106,968 B1
(45) Date of Patent: Aug. 31, 2021

(54) CIRCUIT ARRANGEMENTS AND METHODS FOR TRAVERSING INPUT FEATURE MAPS

(71) Applicant: Xilinx, Inc., San Jose, CA (US)

(72) Inventors: Ehsan Ghasemi, San Jose, CA (US); Elliott Delaye, San Jose, CA (US); Ashish Sirasao, San Jose, CA (US)

(73) Assignee: XILINX, INC., San Jose, CA (US)

(*) Notice: Subject to any disclaimer, the term of this patent is extended or adjusted under 35 U.S.C. 154(b) by 280 days.

(21) Appl. No.: 15/989,075

(22) Filed: May 24, 2018

(51) Int. Cl.
*G06N 3/04* (2006.01)

(52) U.S. Cl.
CPC .................... *G06N 3/04* (2013.01)

(58) Field of Classification Search
CPC .......... G06F 17/153; G06F 17/15; G06N 3/04
See application file for complete search history.

(56) References Cited

U.S. PATENT DOCUMENTS

| | | | |
|---|---|---|---|
| 6,346,825 B1 | 2/2002 | Pang et al. | |
| 8,866,926 B2* | 10/2014 | Silverbrook | B41J 2/14314 348/222.1 |
| 2004/0068331 A1* | 4/2004 | Cronquist | G06F 30/392 700/18 |
| 2005/0216712 A1* | 9/2005 | Butcher | G06F 9/30058 712/234 |
| 2007/0300039 A1* | 12/2007 | Frank | G06F 9/355 711/217 |
| 2016/0379108 A1* | 12/2016 | Chung | G06N 3/04 706/27 |
| 2018/0255307 A1* | 9/2018 | Douady-Pleven | G06T 1/60 |

OTHER PUBLICATIONS

Peemen et al., 'Memory-Centric Accelerator Design for Convolutional Neural Networks'. 2013 IEEE 31st International Conference on Computer Design. Oct. 6-9, 2013. p. 13-19 (Year: 2013).*
Wikipedia, "Row- and column-major order" (Year: 2018).*
Batra. 'CS7643 Deep Learning Fall 2017 Problem Set 3'. (Year: 2017).*

(Continued)

*Primary Examiner* — Jack Chiang
*Assistant Examiner* — Aric Lin
(74) *Attorney, Agent, or Firm* — Crawford Maunu PLLC

(57) ABSTRACT

A circuit arrangement includes a buffer, a height traversal circuit configured to generate a sequence of IFM height values in response to first control signals, a width traversal circuit configured to generate a sequence of IFM width values in response to second control signals, a control circuit, and an address generation circuit. The control circuit is configured to input an OFM height, an OFM width, a kernel height, and a kernel width; generate the first control signals at times based on the OFM height and the kernel height; and generate the second control signals at times based on the OFM width and the kernel width. The address generation circuit is configured to generate a sequence of addresses based on the sequences of IFM height values and IFM width values, provide the sequence of addresses to the buffer, and enable reading from the buffer.

20 Claims, 11 Drawing Sheets

(56) References Cited

OTHER PUBLICATIONS

Akesson, Benny, "An introduction to SDRAM and memory controllers," downloaded Sep. 25, 2017 from http://www.es.ele.tue.nl/premadona/files/akesson01.pdf, pp. 1-30, Eindhoven University of Technology, Eindhoven, The Netherlands.
Chetlur, Sharan et al., "cuDNN: Efficient Primitives for Deep Learning," submitted Oct. 3, 2014, pp. 1-9, https://arxiv.org/pdf/1410.0759.pdf, Cornell University Library.
Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.
Gysel, Philipp, "Ristretto: Hardware-Oriented Approximation of Convolutional Neural Networks," May 20, 2016, pp. 1-73, https://arxiv.org/abs/1605.06402, Cornell University Library.
Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.
Krizhevsky, Alex et al., "ImageNet Classification with Deep Convolutional Neural Networks," Proc. of the 12th International Conference on Neural Processing Systems, Dec. 3, 2012, pp. 1097-1105, ACM Digital Library, www.acm.org.
Mathworks, "im2col," dowloaded Sep. 22, 2017 from https://www.mathworks.com/help/images/ref/im2col.html?searchHighlight=im2col&s_tid=doc_srchtitle, pp. 1-3.
Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/, pp. 1-15.
Shaaban, Muhammed, "Systolic Architectures," Mar. 11, 2003, Kate Gleason College of Engineering, Rochester Institute of Technology, Rochester, New York, USA.
Stanford, "CS231n Convolutional Neural Networks for Visual Recognition," downloaded Sep. 25, 2017 from ittp://cs231n.stanford.edu/, pp. 1-23, Stanford University, Stanford, California, USA.
Warden, Pete, "Why GEMM is at the heart of deep learning," Apr. 20, 2015, pp. 1-9, downloaded from https://petewarden.com/2015/04/20/why-gemm-is-at-the-heart-of-deep-learning/.
Wikipedia, "Convolutional neural network," Sep. 20, 2017, pp. 1-13, downloaded from https://en.wikipedia.org/wiki/Convolutional_neural_network.
Wikipedia, "Deep learning," Sep. 24, 2017, pp. 1-13, downloaded from https://en.wikipedia.org/wiki/Deep_learning.
Wikpedia, "Matrix Multiplication," Sep. 20, 2017, pp. 1-19, downloaded from https://en.wikipedia.org/wiki/Matrix_multiplication.
Wikipedia, "Multiprocessing," May 10, 2017, pp. 1-4, dowloaded from https://en.wikipedia.org/wiki/Multiprocessing.
Wikipedia, "Producer-consumer problem," Sep. 7, 2017, pp. 1-9, downloaded from https://en.wikipedia.org/wiki/Producer%E2%80%93consumer_problem.
Wikipedia, "Row- and colum-major order," Aug. 23, 2017, pp. 1-5, downloaded from https://en.wikipedia.org/wiki/Row-_and_column-major order.
Wikipedia, "Systolic array," Mar. 22, 2017, pp. 1-5, downloaded from https://en.wikipedia.org/wiki/Systolic_array.
Wikipedia, "Very long instruction word," Jul. 13, 2017, pp. 1-3, downloaded from https://en.wikipedia.org/wiki/Very_long_instruction_word.
Xilinx, "Smarter Data Center," downloaded Sep. 22, 2017 from https://www.xilinx.com/applications/data-center.html, pp. 1-4, Xilinx, Inc., San Jose, California, USA.
Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.
Xilinx, "UltraScale Architecture DSP Slice User Guide," UG579 (v1.3), Nov. 24, 2015, pp. 1-74, Xilinx, Inc., San Jose, California, USA.
Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.
Xilinx, "Deep Learning with INT8 Optimization on Xilinx Devices," WP486 (v1.0.1), Apr. 24, 2017, pp. 1-11, Xilinx, Inc., San Jose, California, USA.
Xilinx, "Implementing Memory Structures for Video Processing in the Vivado HLS Tool," XAPP793 (v1.0), Sep. 20, 2012, pp. 1-8, Xilinx, Inc., San Jose, California, USA.
Xilinx, "Two-Dimensional Linear Filtering," XAPP933 (v1.1), Oct. 23, 2007, pp. 1-8, Xilinx, Inc., San Jose, California, USA.
U.S. Appl. No. 15/785,800, filed Oct. 17, 2017, San Jose, California, USA.
Wikipedia, "Kernel (image processing)," Jan. 25, 2018, pp. 1-5, downloaded from https://en.wikipedia.org/wiki/Kernel_(image_processing).

* cited by examiner

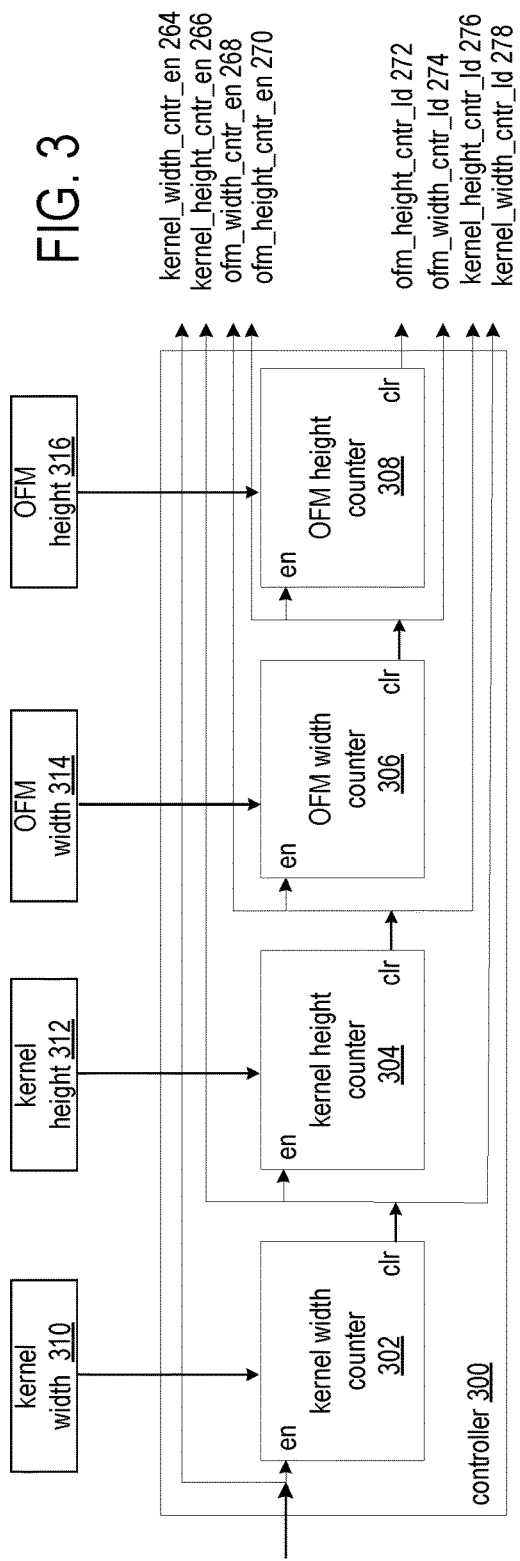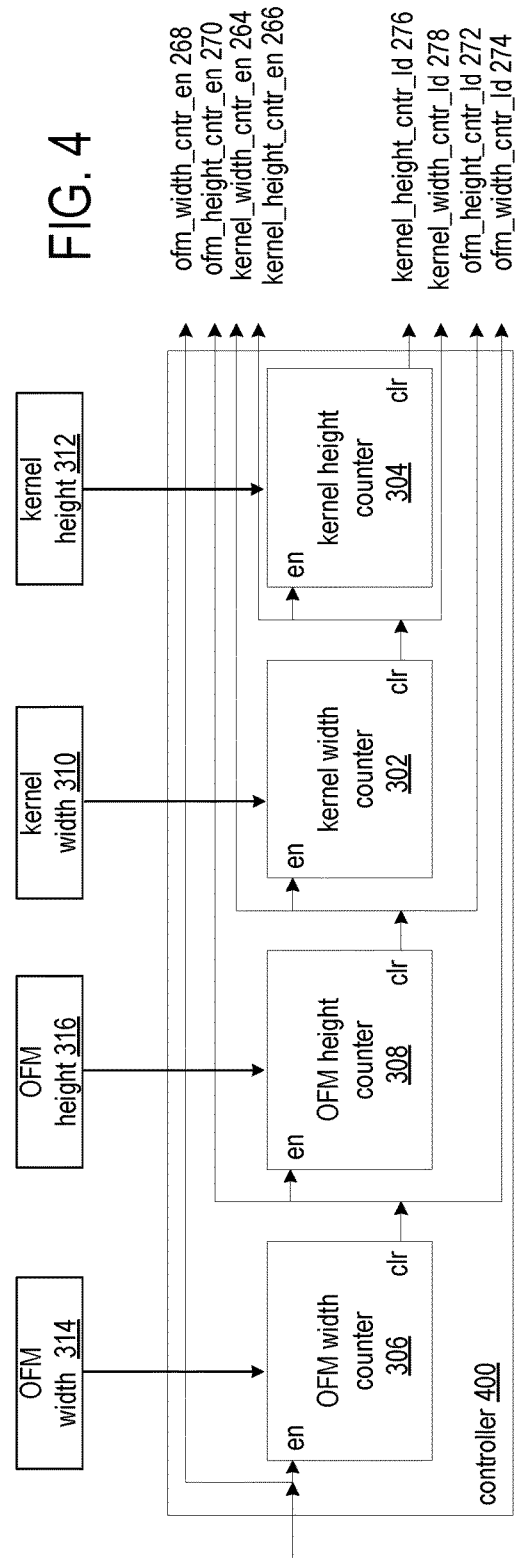

| 0 | 1 | 2 | 3 |
|---|---|---|---|
| 4 | 5 | 6 | 7 |
| 8 | 9 | 10 | 11 |
| 12 | 13 | 14 | 15 |

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0 | 4 | 8 | 12 | 1 | 5 | 9 | 13 | 2 | 6 | 10 | 14 | 3 | 7 | 11 | 15 |

CIRCUIT ARRANGEMENTS AND METHODS FOR TRAVERSING INPUT FEATURE MAPS

TECHNICAL FIELD

The disclosure generally relates to a circuit configured to traverse two-dimensional spatial domains having varied parameters.

BACKGROUND

Convolutional neural networks (CNNs) are used in a variety of applications, including for example, image processing. Convolution operations include a summation of each element of an input feature map (IFM) with neighboring elements that are weighted by a filter, which is also referred to as a kernel.

CNNs include multiple layers in which each layer performs a convolution operation on a three-dimensional volume that includes multiple sets of two-dimensional IFMs. In CNN implementations involving Graphic Processing Units (GPUs), the GPU restructures the convolution operation as a matrix multiplication operation by extracting local neighboring elements that contribute to each element of the IFM and expanding the volume into matrix format before performing the matrix multiplication. The out-of-order access pattern for extracting the local neighboring elements is limited by the memory available for static expansion of the IFM. Because memory access latency of Central Processing Unit (CPU) or GPU platforms is less than that of Field Programmable Gate Arrays (FPGAs), static expansion of the volume is not feasible in FPGA accelerators to the latency and bandwidth limitations.

SUMMARY

A circuit arrangement includes a buffer circuit configured for storage of an input feature map (IFM), a height traversal circuit configured to generate a sequence of IFM height values in response to first control signals, a width traversal circuit configured to generate a sequence of IFM width values in response to second control signals; and a control circuit. The control circuit is configured to input an output feature map (OFM) height value, an OFM width value, a kernel height value, and a kernel width value. The control circuit is further configured to generate the first control signals at times based on the OFM height value and the kernel height value and generate the second control signals at times based on the OFM width value and the kernel width value. The circuit arrangement further includes an address generation circuit coupled to the buffer circuit, the height traversal circuit, and the width traversal circuit. The address generation circuit is configured to generate a sequence of addresses based on the sequences of IFM height values and IFM width values, provide the sequence of addresses to the buffer circuit, and enable reading from the buffer circuit.

A circuit arrangement includes a first circuit configured to traverse a first range of values associated with a height of an output feature map (OFM) in response to a first counter control signal and shift a value of the first range by a stride. The first circuit is further configured to traverse a second range of values associated with a height of a kernel in response to a second counter control signal and sum the shifted value of the first range and a value of the second range to generate a height traversal location. The circuit arrangement further includes a second circuit configured to traverse a third range of values associated with a width of the OFM in response to a third counter control signal and shift a value of the third range by the stride. The second circuit is further configured to traverse a fourth range of values associated with a width of the kernel in response to a fourth counter control signal and sum the shifted value of the third range and a value of the fourth range to generate a width traversal location. The circuit arrangement further includes a third circuit configured to sum a product of the height traversal location and a width of an input feature map (IFM), and the width traversal location to generate an address of data of the IFM for a convolution operation on the data and the kernel. The third circuit is further configured to output the address in response to the height traversal location being within a height of the IFM and the width traversal location being within a width of the IFM.

A method includes inputting, to a control circuit, an output feature map (OFM) height value, an OFM width value, a kernel height value, and a kernel width value; generating, by the control circuit, first control signals at times based on the OFM height value and the kernel height value; and generating, by the control circuit, second control signals at times based on the OFM width value and the kernel width value. The method includes generating, by a height traversal circuit, a sequence of input feature map (IFM) height values in response to the first control signals. The method includes generating, by a width traversal circuit, a sequence of IFM width values in response to the second control signals. The method includes generating, by an address generation circuit, a sequence of addresses based on the sequences of IFM height values and IFM width values; providing, by the address generation circuit, the sequence of addresses to a buffer circuit configured for storage of an IFM; and enabling, by the address generation circuit, reading from the buffer circuit.

Other features will be recognized from consideration of the Detailed Description and Claims, which follow.

BRIEF DESCRIPTION OF THE DRAWINGS

Various aspects and features of the circuit arrangement and method will become apparent upon review of the following detailed description and upon reference to the drawings in which:

FIG. 3 shows a block diagram of an exemplary controller configured to generate control signals input to the pixel iterator of FIG. 2 in an exemplary first traversal order based on parameter values;

FIG. 4 shows a block diagram of an exemplary controller configured to generate control signals input to the pixel iterator of FIG. 2 in an exemplary second traversal order based on parameter values;

FIG. 5A shows an exemplary IFM;

FIG. 5B shows an exemplary storage arrangement of the elements of the IFM of FIG. 5A in the buffer circuit of FIG. 1;

FIG. 5C shows an exemplary storage arrangement of the elements of the IFM of FIG. 5A in the buffer circuit of FIG. 1;

FIGS. 6A and 6B show an exemplary traversal of the IFM of FIG. 5A by the pixel iterator of FIG. 2 for a stride of one;

FIG. 8 shows an exemplary traversal of the IFM of FIG. 5A by the pixel iterator of FIG. 2 for a stride of two;

DETAILED DESCRIPTION

Figure 1:
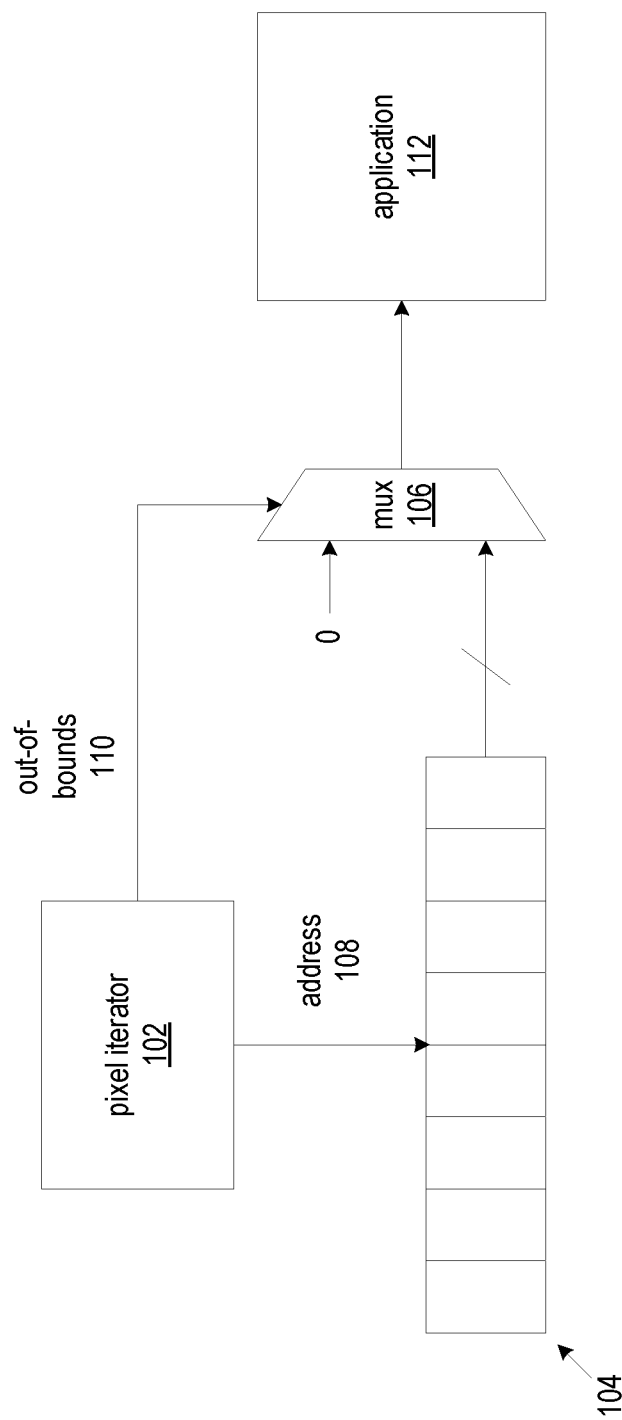
FIG. 1 shows a dataflow of an exemplary circuit arrangement including a pixel iterator.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

As static expansion of IFMs in CNNs have not been practical for FPGA accelerators, some previous implementations dynamically expand the IFM. Previous implementations for dynamic expansion of an input volume (e.g., an IFM) include a custom feeder circuit including a network of shift-registers, multiplexers, and random access memory blocks (BRAMs) suitable for specific values of IFM height, IFM width, kernel height, kernel width, pad, and stride parameters of the expansion. Because a feeder circuit is fixed for specific values of parameters of the expansion, another custom feeder circuit must be generated statically for any variation in any of the values of the parameters. Thus, in a CNN, a specific, custom feeder circuit must be generated for each layer. In some previous implementations, the feeder structure for a CNN can include an individual, custom feeder circuit for each and every layer of the CNN. Custom feeder circuits inefficiently utilize resources of an FPGA because a separate feeder circuit is generated for each layer. Additionally, previous approaches lack scalability because available resources of the FPGA decrease as the number of layers of a CNN increases. An FPGA may not have sufficient resources in which to implement all the feeder circuits for all the layers of the CNN. Moreover, a feeder structure generated according to previous approaches only supports the specific CNN based on specific values of the parameters of the expansion for which the feeder structure was generated, rendering the feeder structure useless should any of the values of the parameters change.

The disclosed circuit arrangements and methods provide approaches for traversal through a two-dimensional spatial domain. In contrast to previous approaches, the disclosed approaches are scalable, area-efficient, and/or adaptable to variation in any of the values of the parameters. At least one specific implementation includes a circuit, hereinafter referred to a pixel iterator, that uses limited hardware resources and includes, for example, one multiplier, six adders, and four comparators, in contrast to the network of multiplexers of previous approaches. The pixel iterator supports any variation in values of the parameters of the expansion input to the pixel iterator.

At least one implementation provides runtime programmable support for any traversal pattern in a two-dimensional spatial domain. The values of the input parameters can be set at runtime to change the size and the order of the traversal pattern. Thus, the same pixel iterator can be adapted to support multiple layers of a CNN, such as a maxpool layer and/or an average pool layer. The pixel iterator can be used in applications other than image processing, such as those involving traversal in a one-dimensional or two-dimensional spatial domain. For example, the disclosed approaches can be used for machine learning, Deep Neural Networks (DNNs), Long-Short Term Memory (LSTM), video processing, image processing, vision applications, and General Matrix Multiplication.

At least one implementation is scalable for any CNN or application. The pixel iteration enables automatic adjustment of a value of an input parameter with minimal area overhead. For example, the pixel iterator can be used with a CNN having a maximum image size of ten pixels (a maximum IFM size of ten elements) that uses three bits for calculation. The same pixel iterator can be used with a CNN having a maximum image size of 1,024 pixels (a maximum IFM size of 1024 elements) that uses ten bits for calculation.

The pixel iterator can serve as a building block of a large application, such as CNNs or matrix multiplication. In contrast to previous approaches for dynamic expansion where the feeder structure is inextricably linked to the number of the multiply-and-accumulate (MAC) circuits of a CNN, the disclosed approaches enable a single pixel iterator to be shared by all the MAC circuits, which reduces the area overhead and improves scalability.

FIG. 1 shows a dataflow of an exemplary circuit arrangement including a pixel iterator. The pixel iterator 102 is coupled to a buffer circuit 104 that is configured to store an unrolled two-dimensional spatial domain as a one-dimensional array. The pixel iterator 102 traverses the buffer circuit 104 by generating addresses to perform an out-of-order dynamic expansion of a three-dimensional volume that includes d sets of two-dimensional IFMs. In at least one implementation, the pixel iterator 102 inserts padding when the traversal crosses a boundary of the two-dimensional spatial domain, such as the height, ifm_h, of an IFM or the width, ifm_w, of an IFM. For example, the pixel iterator 102 provides an out-of-bounds signal 110 to a multiplexer 106 and the multiplexer 106 selects an input having a constant value (e.g., zero), which can be an out-of-bounds address, and provides the constant value to an application 112. If the traversal is in-bounds, the data value(s) (e.g., indexed pixels) stored in the buffer circuit 104 at the address(es) generated by the pixel iterator 102 is provided to an application 112, such as an array of MAC circuits.

Figure 2:
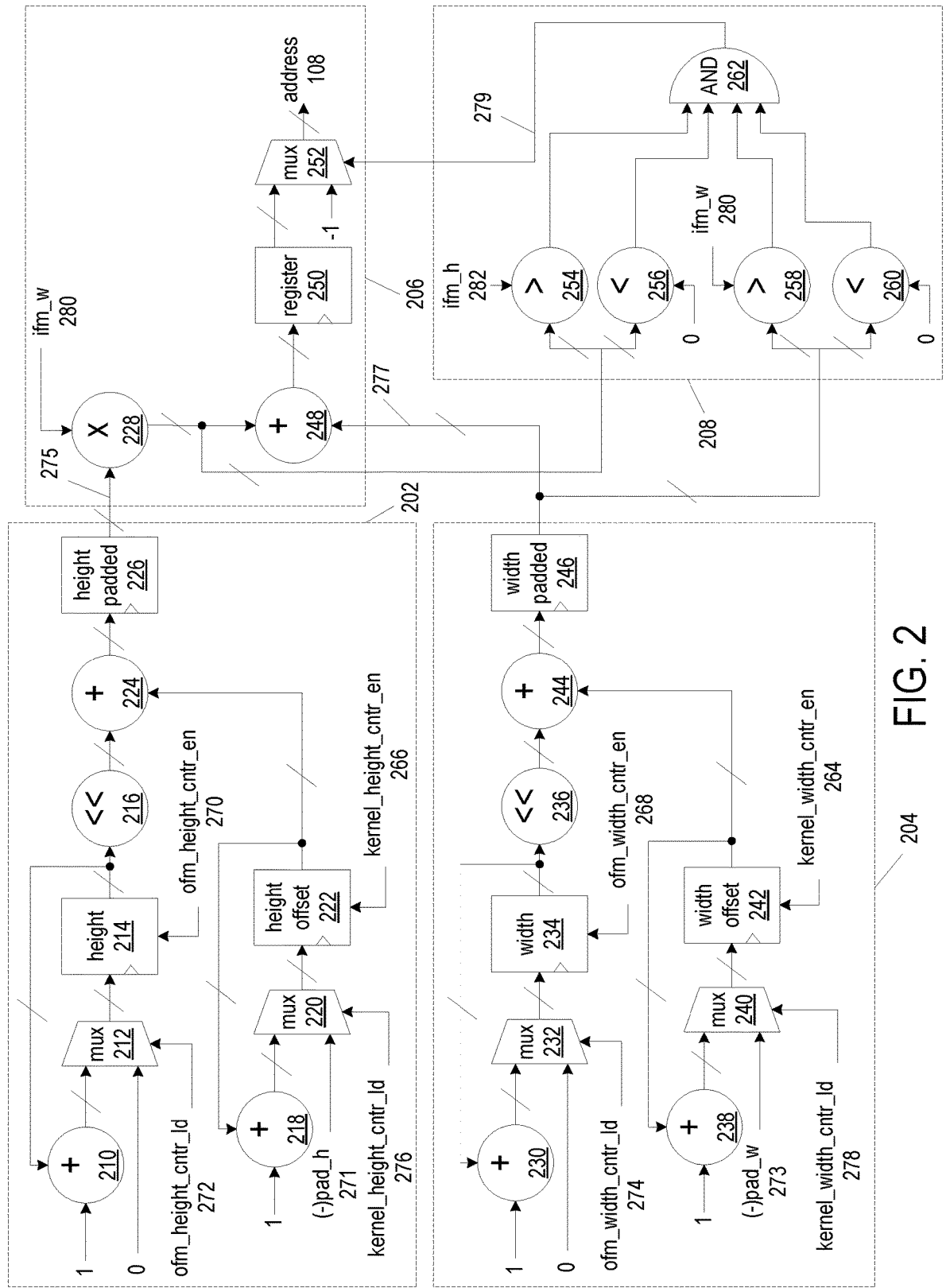
FIG. 2 shows a block diagram of exemplary circuitry of the pixel iterator of FIG. 1.

FIG. 2 shows a block diagram of exemplary circuitry of the pixel iterator 102 of FIG. 1. The pixel iterator 102 includes a height traversal circuit 202, a width traversal circuit 204, and an address generation circuit 206. At least one implementation of the present disclosure includes a boundary check circuit 208. Although the disclosed approaches can be used in other applications, the circuitry shown in FIG. 2 is described with respect to image processing.

The height traversal circuit 202 includes height register 214 that stores values ranging between zero and the height, ofm_h, of an output feature map (OFM). The height, ofm_h, of the OFM is defined by (ifm_h+2*pad_h−k_h)/stride+1, where ifm_h is the height of the IFM, pad_h is the height of the padding on the top and bottom edges of the IFM, k_h is the height of the kernel, and stride is the stride for traversing the IFM. Reading a value from the height register 214 is enabled by control signal ofm_height_cntr_en 270. Selection of the value written to the height register 214 is controlled by the load control signal ofm_height_cntr_Id 272 to multiplexer 212. Initially, the control signal ofm_height_cntr_Id 272 selects the input of the multiplexer 212 having the constant value zero. Subsequently, the control signal ofm_height_cntr_Id 272 selects an input of the multiplexer 212 that is the value read from the height register 214 incremented by one via adder 210. The incremented value is written to the height register 214.

The value read from the height register 214 is left-shifted by $\log_2(\text{stride})$ via left-shifter 216 to perform a vertical stride. The example uses a stride value that is a power of two; however, a different multiplier can be used.

The height traversal circuit 202 includes height_offset register 222 that stores values ranging between the negated height, −pad_h, of the padding and the height of the kernel minus the height of the padding, k_h−pad_h. Reading a value from the height_offset register 222 is enabled by control signal kernel_height_cntr_en 266. Selection of the value written to the height_offset register 222 is controlled by the load control signal kernel_height_cntr_Id 276 to multiplexer 220. Initially, the control signal kernel_height_cntr_Id 276 selects an input of the multiplexer 220 having the negated height −pad_h of the padding 271. Subsequently, the control signal kernel_height_cntr_Id 276 selects an input of the multiplexer 220 that is the value read from the height_offset register 222 incremented by one via adder 218 until the height of the kernel minus the height of the padding, k_h−pad_h, is reached. Subsequently, the control signal kernel_height_cntr_Id 276 selects an input of the multiplexer 220 having the height, pad_h, of the pad 271. For each element (pixel) of the OFM traversed by the height register 214, values stored in the height_offset register 222, which span the height, k_h, of the kernel, are traversed.

Vertical traversal of the two-dimensional IFM includes summation of a value stored in the height register 214 and a value stored in the height_offset register 222 via adder 224. The result of the summation is the height traversal location 275 of an element of the IFM and is stored in height padded register 226.

The width traversal circuit 204 includes width register 234 that stores values ranging between zero and the width, ofm_w, of the OFM. The width, ofm_w, of the OFM is defined by (ifm_w+2*pad_w−k_w)/stride+1, where ifm_w is the width of the IFM, pad_w is the width of the padding on the left and right edges of the IFM, k_w is the width of the kernel, and stride is the stride for traversing the IFM. Reading a value from the width register 234 is enabled by control signal ofm_width_cntr_en 268. Selection of the value written to the width register 234 is controlled by the load control signal load ofm_width_cntr_Id 274 to multiplexer 232. Initially, the control signal ofm_width_cntr_Id 274 selects the input of the multiplexer 232 having the constant value zero. Subsequently, the control signal ofm_width_cntr_Id 274 selects an input of the multiplexer 232 that is the value read from the width register 234 incremented by one via adder 230. The incremented value is written to the width register 234.

The value read from the width register 234 is left-shifted by $\log_2(\text{stride})$ via left-shifter 236 to perform a horizontal stride. The example uses a stride value that is a power of two; however, a different multiplier can be used.

The width traversal circuit 204 includes width_offset register 242 that stores values ranging between the negated width, −pad_w, of the padding and the width of the kernel minus the width of the padding, k_w−pad_w. Reading a value from the width_offset register 242 is enabled by control signal kernel_width_cntr_en 264. Selection of the value written to the width_offset register 242 is controlled by the load control signal kernel_width_cntr_Id 278 to multiplexer 240. Initially, the control signal kernel_width_cntr_Id 278 selects an input of the multiplexer 240 having the negated width, −pad_w, of the padding 273. Subsequently, the control signal kernel_width_cntr_Id 278 selects an input of the multiplexer 240 that is the value read from the width_offset register 242 incremented by one via adder 238 until the width of the kernel minus the width of the padding, k_w−pad_w, is reached. Subsequently, the control signal kernel_width_cntr_Id 278 selects an input of the multiplexer 240 having the width, pad_w, of the padding 273. For each element (pixel) of the OFM traversed by the width register 234, values stored in the width_offset register 242, which span the width, k_w, of the kernel, are traversed.

Horizontal traversal of the two-dimensional IFM includes summation of a value stored in the width register 234 and a value stored in the width_offset register 242 via adder 244. The output of the adder 244 is the width traversal location 277 of an element of the IFM, and is stored in width_padded register 246.

Because the two-dimensional IFM is unrolled and stored as a one-dimensional array in the buffer circuit 104, the address 108 for an element of the IFM in the buffer circuit 104 generated by the pixel iterator 102 is a combination of the height traversal location 275 and the width traversal location 277. The address 108 is defined by height_padded*ifm_w+width_padded, where height_padded is the height traversal location 275 read from the height_padded register 226 and width_padded is the width traversal location 277 read from the width_padded register 246. The address generation circuit 206 includes multiplier 228 that performs the multiplication of the height traversal location 275 with the width, ifm_w, of the IFM 280 and adder 248 that performs the summation of the output of multiplier 228 and the width traversal location 277. The result of the adder 248 is stored in register 250.

The address 108 generated by the pixel iterator 102 may be beyond the height, ifm_h, of the IFM 282 and/or the width, ifm_w, of the IFM 280. If an element is "out-of-bounds," then a constant value (e.g., zero) is inserted to pad the IFM at the boundary. The boundary check circuit 208 includes comparators 254, 256, 258, and 260 to determine whether the height traversal location 275 is beyond the height, ifm_h, of the IFM 282 and determine whether the width traversal location 277 is beyond the width, ifm_w, of the IFM 280. The comparator 254 determines whether the height traversal location 275 is greater than the height, ifm_h, of the IFM 282. The comparator 256 determines whether the height traversal location 275 is less than zero. The comparator 258 determines whether the width traversal location 277 is greater than the width, ifm_w, of the IFM 280. The comparator 260 determines whether the width traversal location 277 is less than zero. The outputs of the comparators 254, 256, 258, and 260 are input to AND gate 262. The output 279 of the AND gate 262 is provided to the selection input of multiplexer 252 of the address generation circuit 206. If any of the comparisons are true (e.g., any of the outputs are logic "1"), the multiplexer 252 selects an input having a constant value (e.g., −1) and outputs the constant value as the address 108. The address 108 being −1, for example, indicates to the application 112 that the pixel corresponding to the address 108 is outside the boundary of the image. The output 279 of the AND gate 262 can be analogous to the out-of-bounds signal 110 shown in FIG. 1.

FIG. 3 shows a block diagram of an exemplary controller 300 configured to generate control signals input to the pixel iterator 102 of FIG. 2 in an exemplary first traversal order based on parameter values. The controller 300 includes counters for the parameters of the expansion of an IFM. The parameters include the width, k_w, of the kernel; the height, k_h, of the kernel; the width, ofm_w, of the OFM; and the height, ofm_h, of the OFM. The width, ofm_w, of the OFM is defined by (ifm_w+2*pad_w−k_w)/stride+1, where ifm_w is the width of the IFM, pad_w is the width of the padding on the left and right edges of the IFM, and stride is the stride for traversing the IFM. The height, ofm_h, of the OFM is defined by (ifm_h+2*pad_h−k_h)/stride+1, where ifm_h is the height of the IFM and pad_h is the height of the padding on the top and bottom edges of the IFM. The values of the width, k_w, of the kernel; the height, k_h, of the kernel; the width, ofm_w, of the OFM; and the height, ofm_h, of the OFM are represented by kernel_width 310, kernel_height 312, OFM width 314, and OFM height 316, respectively.

The value of each counter of the controller 300 begins at zero and resets when the value reaches an upper bound, which is based on the parameters. The kernel width counter 302 counts from zero to the kernel width 310, the kernel height counter 304 counts from zero to the kernel height 312, the OFM width counter 306 counts from zero to the OFM width 314, and the OFM height counter 308 counts from zero to the OFM height 316. The outputs of the counters are the control signals provided to the pixel iterator 102. The kernel width counter 302 outputs the enable control signal kernel_width_cntr_en 264 and the load control signal kernel_width_cntr_ld 278; the kernel height counter 304 outputs the enable control signal kernel_height_cntr_en 266 and the load control signal kernel_height_cntr_ld 272; the OFM width counter 306 outputs the enable control signal ofm_width_cntr_en 268 and the load control signal ofm_width_cntr_ld 274; and the OFM height counter 308 outputs the enable control signal ofm_height_cntr_en 270 and the load control signal ofm_height_cntr_ld 272.

The counters of the controller 300 are coupled to one another in a chain so that when one counter resets, as indicated by a clear output signal at the "clr" pin, the next counter increments by one. The clear output of the kernel width counter 302 is coupled to an enable input of kernel height counter 304. The clear output of the kernel height counter 304 is coupled to an enable input of OFM width counter 306. The clear output of the OFM width counter 306 is coupled to an enable input of OFM height counter 308.

As arranged in the controller 300, the kernel width counter 302 counts from zero to the kernel width 310 and then resets. In response to the kernel width counter 302 resetting, the kernel height counter 304 counts from zero to the kernel height 312 and then resets. In response to the kernel height counter 304 resetting, the OFM width counter 306 counts from zero to the OFM width 314 and then resets. In response to the OFM width counter 306 resetting, the OFM height counter 308 counts from zero to the OFM height 316 and then resets. The controller 300 effectively counts according to the following pseudocode:

for (int h=0, h<ofm_h, h++)
      for (int w=0, w<ofm_w, w++)
        for (int kh=0, kh<k_h, kh++)
          for (int kw=0, kw<k_w, kw++)

The arrangement of the counters can be changed to alter the traversal order of the pixel iterator 102. The pixel iterator 102 supports any traversal order and any chain order of the counters.

FIG. 4 shows a block diagram of an exemplary controller 400 configured to generate control signals input to the pixel iterator 102 of FIG. 2 in an exemplary second traversal order based on parameter values. Compared to the controller 300 of FIG. 3, the controller 400 includes the same counters as the controller 300 (the kernel width counter 302, the kernel height counter 304, the OFM width counter 306, and the OFM height counter 308) but arranged in a different chain order.

The counters of the controller 400 are coupled to one another in a chain so that when one counter resets, as indicated by the clear output signal at the "clr" pin, the next counter increments by one. The clear output of the OFM width counter 306 is coupled to an enable input of OFM height counter 308. The clear output of the OFM height counter 308 is coupled to an enable input of the kernel width counter 302. The clear output of the kernel width counter 302 is coupled to an enable input of kernel height counter 304.

As arranged in the controller 400, the OFM width counter 306 counts from zero to the OFM width 314 and then resets. In response to the OFM width counter 306 resetting, the OFM height counter 308 counts from zero to the OFM height 316 and then resets. In response to the OFM height counter 308 resetting, the kernel width counter 302 counts from zero to the kernel width 310 and then resets. In response to the kernel width counter 302 resetting, the kernel height counter 304 counts from zero to the kernel height 312 and then resets. The controller 400 effectively counts according to the following pseudocode:

for (int kh=0, kh<k_h, kh++)
      for (int kw=0, kw<k_w, kw++)
        for (int h=0, h<ofm_h, h++)
          for (int w=0, w<ofm_w, w++)

FIG. 5A shows an exemplary IFM 500. The IFM 500 is a 4×4 IFM and includes sixteen elements indexed from 0 to 15. Each element of the IFM 500 can correspond to a pixel of an input image in an exemplary application.

FIG. 5B shows an exemplary arrangement of the elements of the IFM 500 of FIG. 5A in the buffer circuit 104 of FIG. 1. The buffer circuit 104 stores the IFM 500 in row-major order in sequential addresses of the buffer circuit 104. In FIG. 5B, the IFM 500 is unrolled by rows so that element 0 of the IFM 500 is stored at address 0 of the buffer circuit 104, element 1 of the IFM 500 is stored at address 1 of the buffer circuit 104, . . . , and element 15 of the IFM 500 is stored at address 15 of the buffer circuit 104.

FIG. 5C shows an exemplary arrangement of the elements of the IFM 500 of FIG. 5A in the buffer circuit 104 of FIG. 1. The buffer circuit 104 stores the IFM 500 in column-major order in sequential addresses of the buffer circuit 104. In FIG. 5C, the IFM 500 is unrolled by columns so that element 0 of the IFM 500 is stored at address 0 of the buffer circuit 104, element 4 of the IFM 500 is stored at address 1 of the buffer circuit 104, element 8 of the IFM 500 is stored at address 1 of the buffer circuit 104, . . . , and element 15 of the IFM 500 is stored at address 15 of the buffer circuit 104.

Figure 6A:
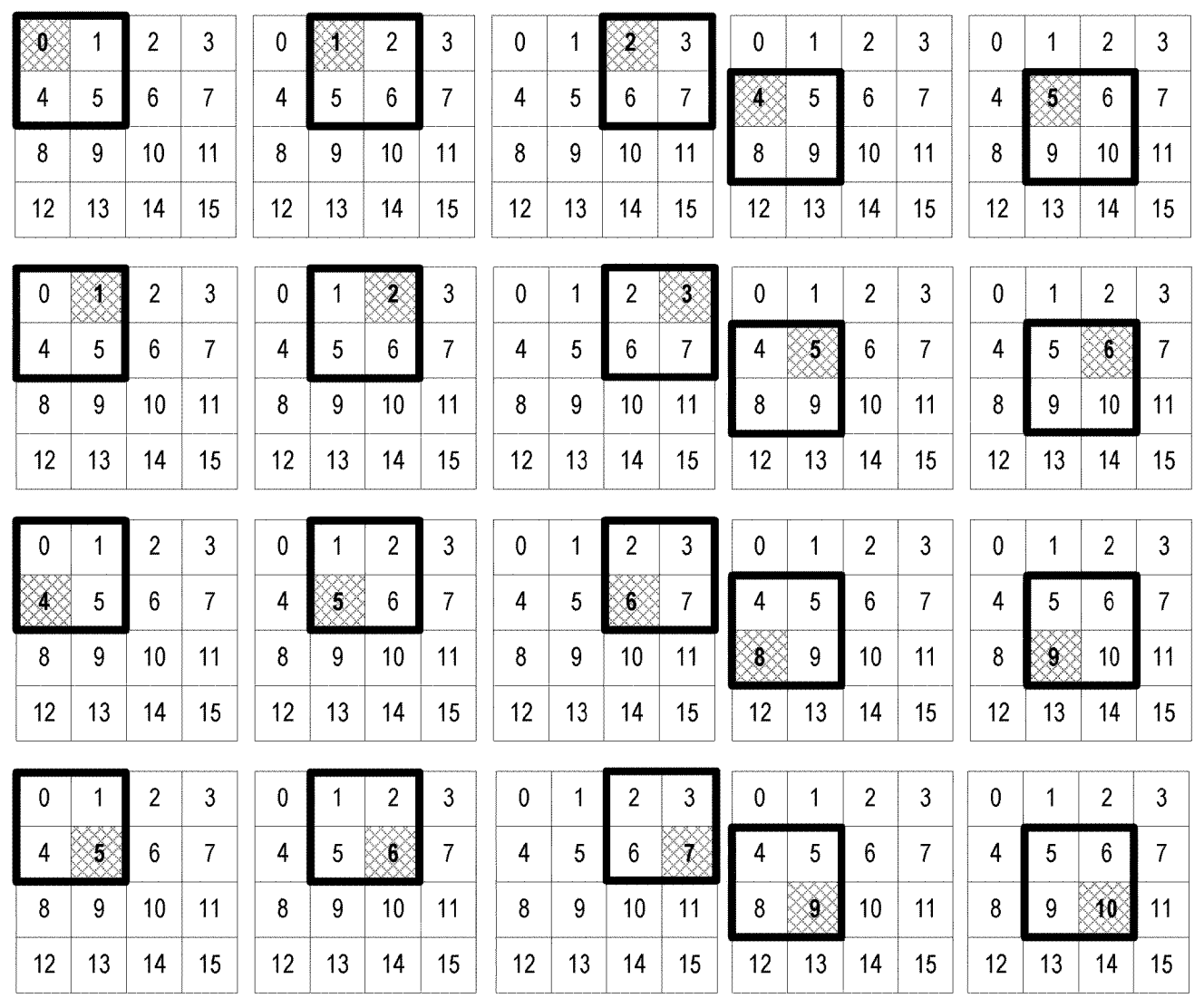
Figure 6B:
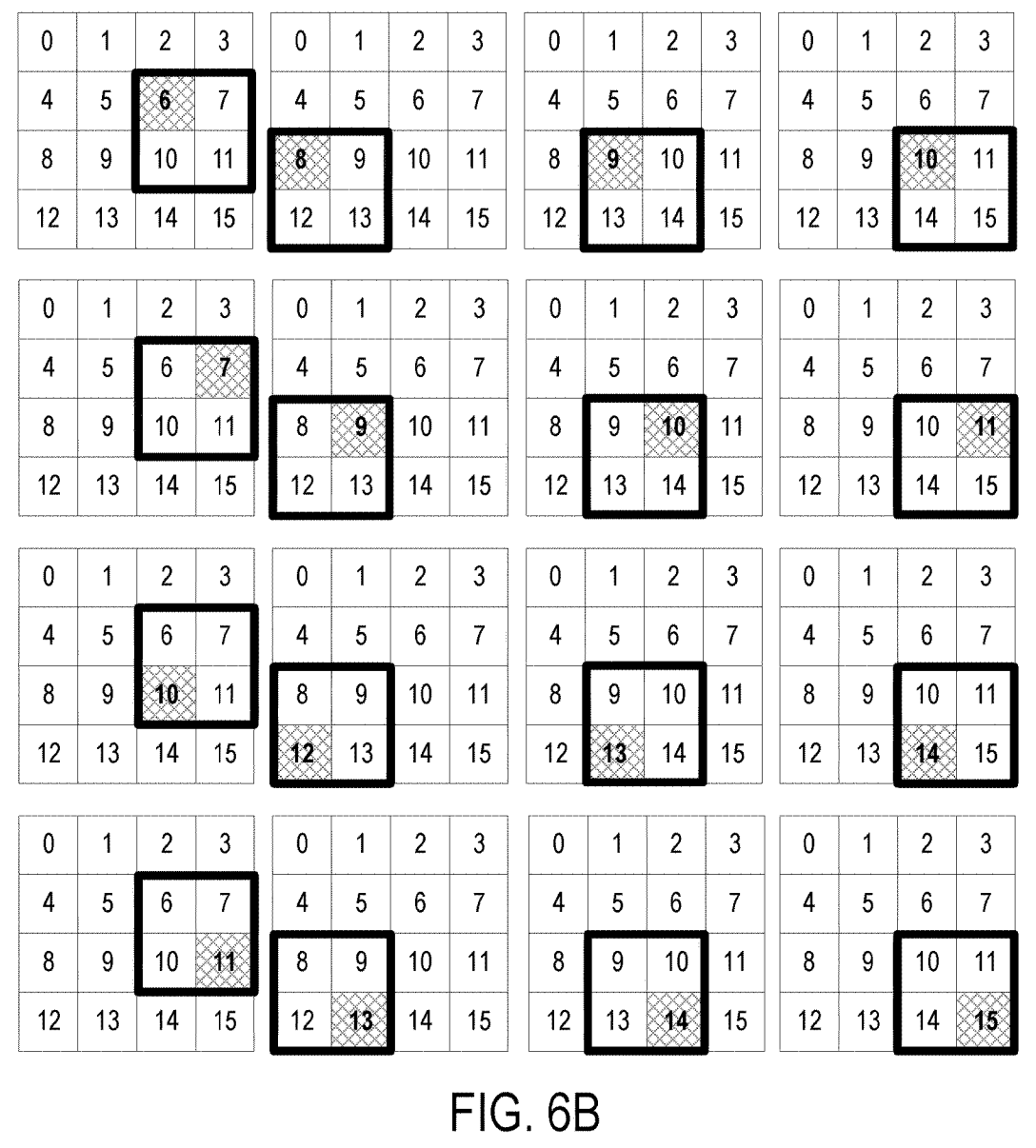

FIGS. 6A and 6B show an exemplary traversal of the IFM 500 of FIG. 5A by the pixel iterator 102 of FIG. 2 for a stride of one. Each column of FIGS. 6A and 6B represents a convolution operation performed on elements of the IFM 500 and a 2×2 kernel with a stride of one (stride=1). Because the height and width of the kernel are two, the height and width of the IFM 500 are four, and the stride is one, the height and width of the OFM is three (a 3×3 OFM). Accordingly, FIGS. 6A and 6B show nine columns (the first five columns in FIG. 6A, the last four columns in FIG. 6B) corresponding to the nine convolution operations necessary to generate the nine elements of the OFM. Each element of the OFM corresponds to a pixel of an output image.

The bold square in FIGS. 6A and 6B represents the 2×2 kernel. The shaded element of the IFM 500 with a bold element number represents the multiplication of the shaded element of the kernel with the shaded element of the IFM 500. For example, the first convolution operation, as shown by the first column of FIG. 6A, includes multiplying the element at the first column and first row of the kernel with element 0 of the IFM 500, multiplying the element at the second column and first row of the kernel with element 1 of the IFM 500, multiplying the element at the first column and second row of the kernel with element 4 of the IFM 500, and multiplying the element at the second column and second row of the kernel with element 5 of the IFM 500. The ninth convolution operation, as shown by the last column of FIG. 6B, includes multiplying the element at the first column and first row of the kernel with element 10 of the IFM 500, multiplying the element at the second column and first row of the kernel with element 11 of the IFM 500, multiplying the element at the first column and second row of the kernel with element 14 of the IFM 500, and multiplying the element at the second column and second row of the kernel with element 15 of the IFM 500.

Referring back to FIG. 3 and traversal order associated with the controller 300, the width of the kernel is traversed first, the height of the kernel is traversed second, the width of the OFM is traversed third, and the height of the OFM is traversed fourth. Accordingly, the pixel iterator 102 generates the addresses for all the elements of the IFM 500 for one convolution operation before generating the addresses for all the elements of the IFM 500 for another convolution operation. The pixel iterator 102 generates the addresses for the convolution operation that outputs the element at the first column and first row of the OFM, then the addresses for the convolution operation that outputs the element at the second column and first row of the OFM, then the addresses for the convolution operation that outputs the element at the third column and first row of the OFM, then the addresses for the convolution operation that outputs the element at the first column and second row of the OFM, and so on.

Figure 7A:
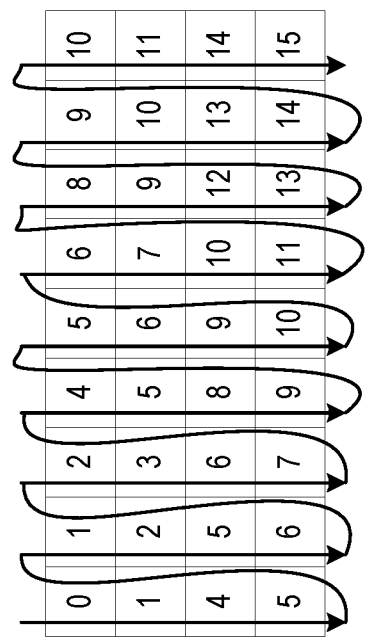
FIG. 7A shows an exemplary address generation pattern of the pixel iterator of FIG. 2 in response to the control signals generated by the controller of FIG. 3.

FIG. 7A shows an exemplary address generation pattern of the pixel iterator 102 of FIG. 2 in response to the control signals generated by the controller 300 of FIG. 3. As described above, the traversal order associated with the controller 300 causes the pixel iterator 102 to generate the addresses for all the elements of the IFM 500 for one convolution operation before generating the addresses for all the elements of the IFM 500 for another convolution operation. Accordingly, the arrow shown in FIG. 7A that represents the address generation pattern travels down a column before traveling down the next column. The address generation pattern associated with the controller 300 is element 0, element 1, element 4, element 5, element 1, element 2, element 5, element 6, . . . , element 10, element 11, element 14, element 15.

Figure 7B:
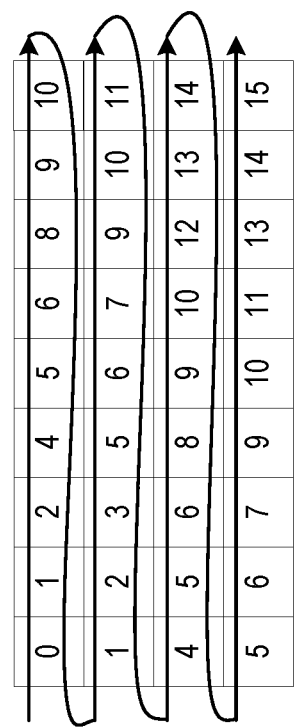
FIG. 7B shows an exemplary address generation pattern of the pixel iterator of FIG. 2 in response to the control signals generated by the controller of FIG. 4.

FIG. 7B shows an exemplary address generation pattern of the pixel iterator 102 of FIG. 2 in response to the control signals generated by the controller 400 of FIG. 4. The arrow shown in FIG. 7B that represents the address generation pattern travels across a row before traveling across the next row. The address generation pattern associated with the controller 400 is element 0, element 1, element 2, element 4, element 5, element 6, element 8, element 9, element 10, . . . , element 11, element 13, element 14, element 15. The address generation pattern shown in FIG. 7B performs the multiple convolutions in pipelined fashion so that an element of the kernel (a weight pixel) is shared for each row in FIG. 7B, which reduces the frequency of changing the element of the kernel.

Figure 8:
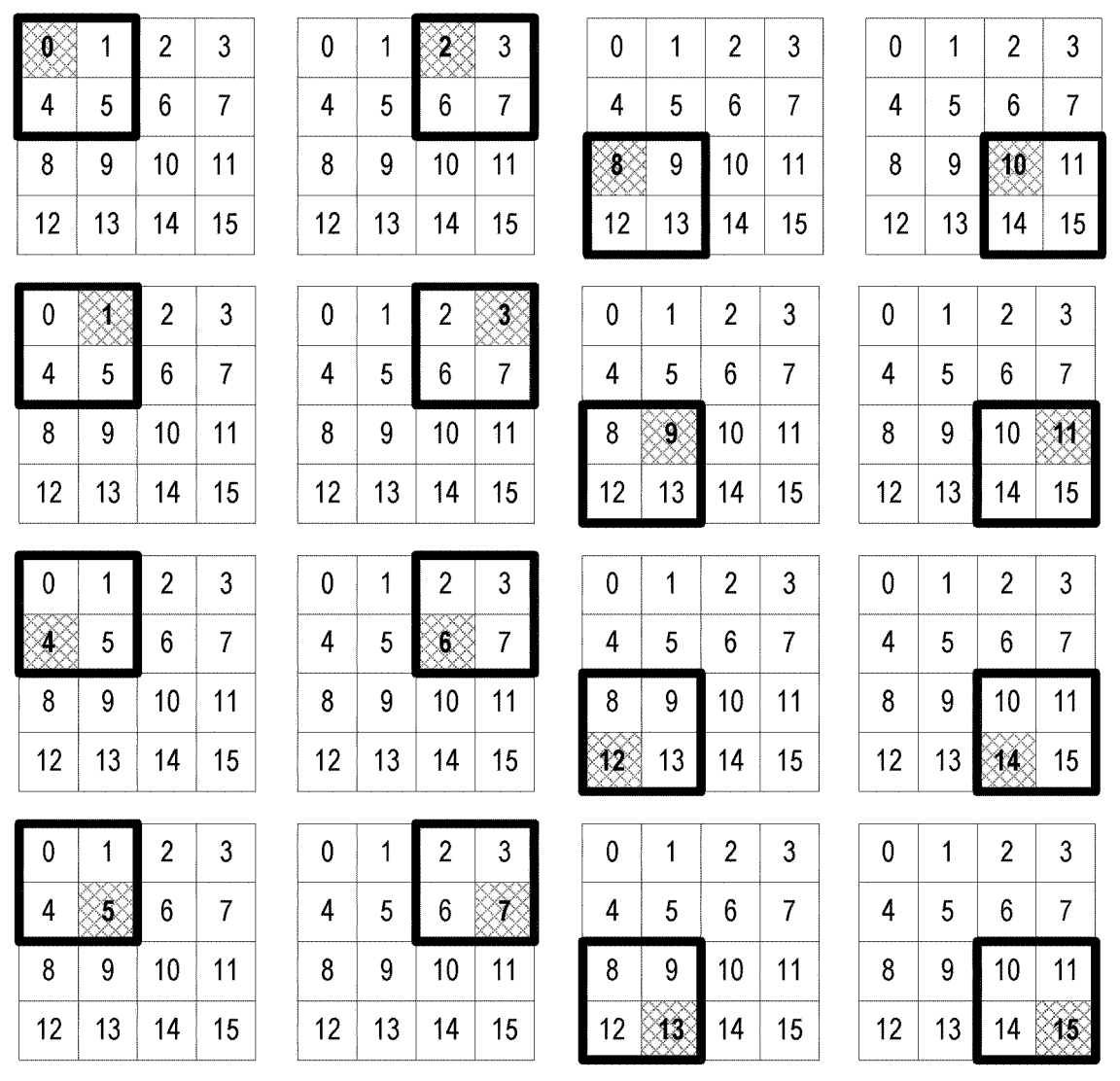

FIG. 8 shows an exemplary traversal of the IFM 500 of FIG. 5A by the pixel iterator 102 of FIG. 2 for a stride of two. Each column of FIG. 8 represents a convolution operation performed on elements of the IFM 500 and a 2×2 kernel with a stride of two (stride=2). Because the height and width of the kernel is two, the height and width of the IFM 500 is four, and the stride is two, the height and width of the OFM is two (a 2×2 OFM). Accordingly, FIG. 8 shows four columns corresponding to the four convolution operations necessary to generate the four elements of the OFM. Each element of the OFM corresponds to a pixel of an output image.

The bold square in FIG. 8 represents the 2×2 kernel. The shaded element of the IFM 500 with a bold element number represents the multiplication of the shaded element of the kernel with the shaded element of the IFM 500. For example, the third convolution operation, as shown by the third column of FIG. 8, includes multiplying the element at the first column and first row of the kernel with element 2 of the IFM 500, multiplying the element at the second column and first row of the kernel with element 3 of the IFM 500, multiplying the element at the first column and second row of the kernel with element 6 of the IFM 500, and multiplying the element at the second column and second row of the kernel with element 7 of the IFM 500.

Figure 9:
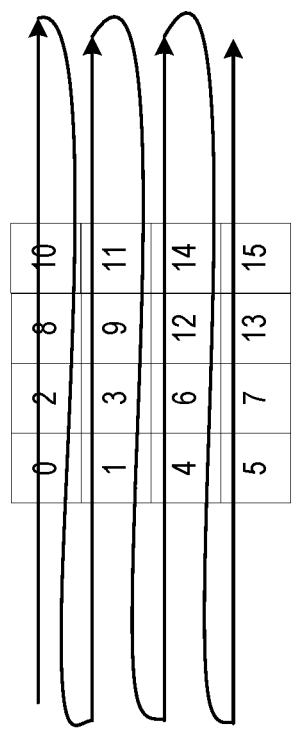
FIG. 9 shows order in which the pixel iterator of FIG. 2 generates the elements of the IFM of FIG. 5A in response to the control signals generated by the controller of FIG. 4.

FIG. 9 shows order in which the pixel iterator 102 of FIG. 2 generates the elements of the IFM 500 of FIG. 5A in response to the control signals generated by the controller 400 of FIG. 4. The arrow shown in FIG. 9 that represents the address generation pattern travels across a row before traveling across the next row. The address generation pattern associated with the controller 400 is element 0, element 2, element 8, element 10, . . . , element 5, element 7, element 13, element 15.

Figure 10:
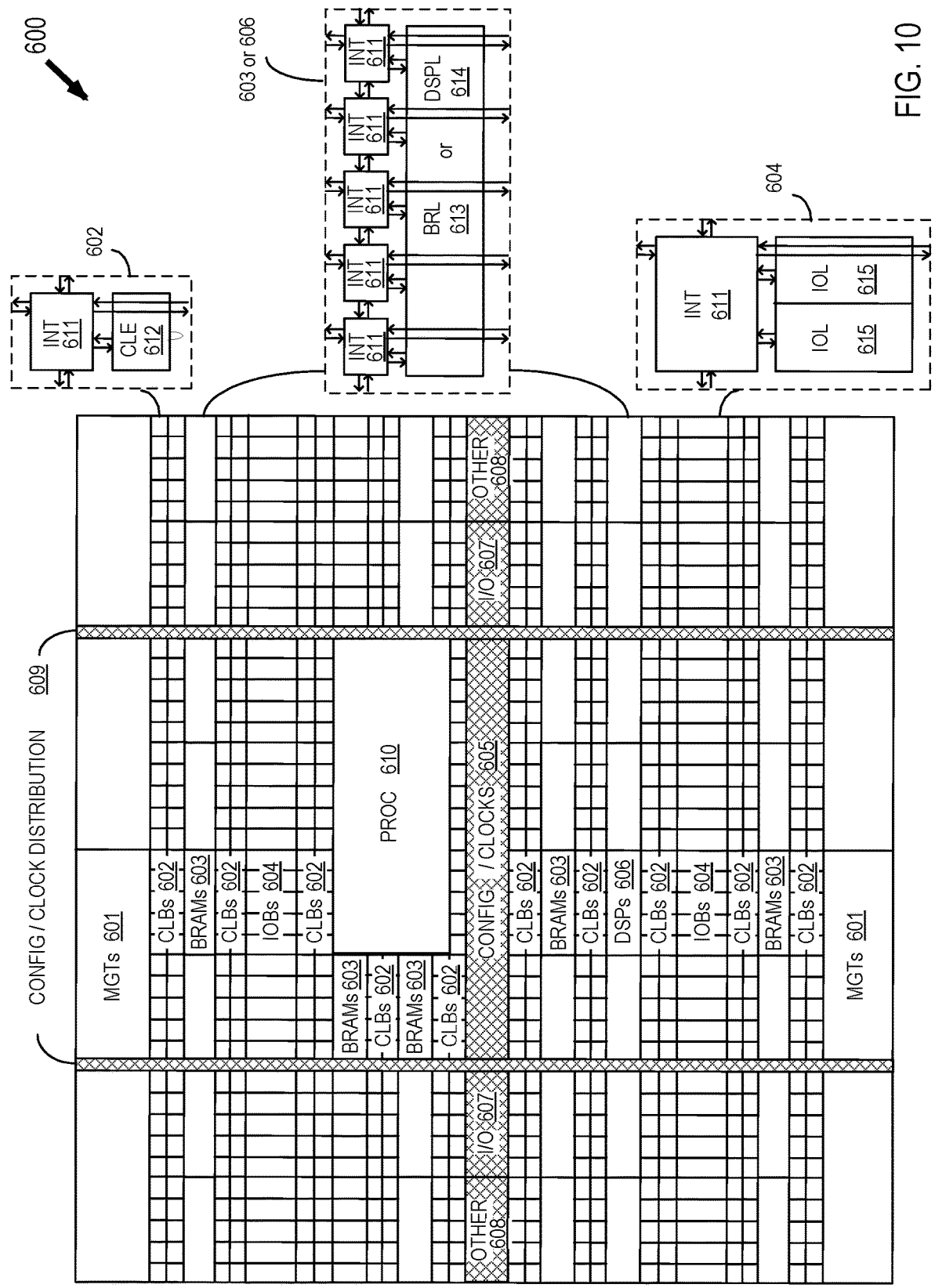
FIG. 10 shows a programmable integrated circuit (IC) on which the disclosed circuits and processes may be implemented.

FIG. 10 shows a programmable integrated circuit (IC) 600 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 10 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 10.

For example, a CLB 602 can include a configurable logic element (CLE) 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 606 can include a DSP logic element (DSPL) 614 in addition to an appropriate number of programmable interconnect elements. An 10B 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

A columnar area near the center of the die (shown shaded in FIG. 10) is used for configuration, clock, and other control logic. Horizontal areas 609 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 10 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual programmable IC, more than one adjacent column of CLBs is typically included wherever the CLBs appear, to facilitate the efficient implementation of user logic.

Figure 11:
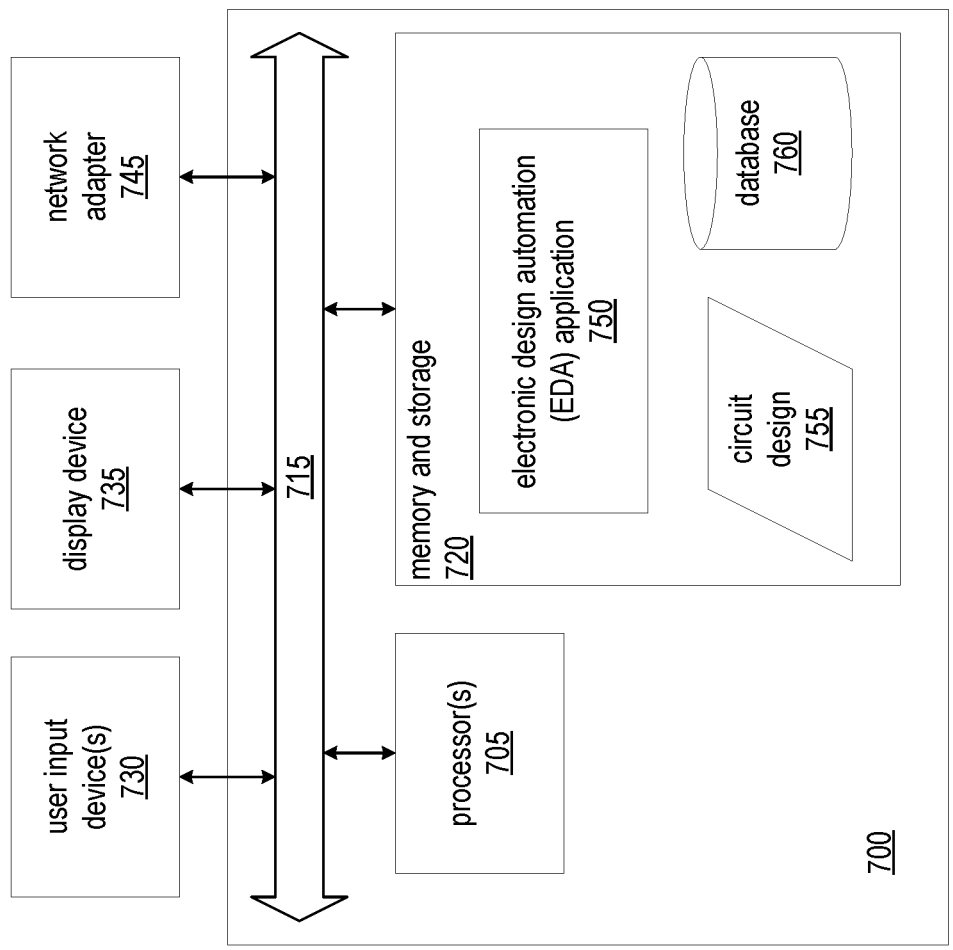
FIG. 11 is a block diagram illustrating an exemplary data processing system.

FIG. 11 is a block diagram illustrating an exemplary data processing system (system) 700. System 700 is an example of an electronic design automation (EDA) system. As pictured, system 700 includes at least one processor circuit (or "processor"), e.g., a Central Processing Unit (CPU) 705 coupled to memory and storage arrangement 720 through a system bus 715 or other suitable circuitry. System 700 stores program code and circuit design 755 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750. EDA application 750, being implemented in the form of executable program code, is executed by processor(s) 705. As such, EDA application 750 is considered part of system 700. System 700, while executing EDA application 750, receives and operates on circuit design 755 that includes at least one instance of the pixel iterator 102. In one aspect, system 700 performs a design flow on circuit design 755, and the design flow may include synthesis, mapping, placement, and routing. Although, multiple values of the parameters for expanding an IFM can be stored in the database 760, a single instance of the pixel iterator 102 supports all values of the parameters.

EDA application 750, circuit design 755, database 760, and any data items used, generated, and/or operated upon by EDA application 750 are functional data structures that impart functionality when employed as part of system 700 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for formatting data for performing convolution operations. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement, comprising:
    a buffer circuit configured for storage of elements i and i+1, for a plurality of sequential values of i, of an input feature map (IFM) at a plurality of corresponding sequential addresses of the buffer circuit, wherein elements i and i+1 are in row-major or column major order;
a height traversal circuit responsive to first control signals and including a first adder circuit configured to increment an output feature map (OFM) height counter value, a second adder circuit configured to increment a height offset value, and a third adder circuit configured to generate a sequence of height traversal values based on the OFM height counter value and the height offset value;
a width traversal circuit responsive to second control signals and including a fourth adder circuit configured to increment an OFM width counter value, a fifth adder circuit configured to increment a width offset value, and a sixth adder circuit configured to generate a sequence of width traversal values based on the OFM width counter value and the width offset value; and
a control circuit configured to:
input an OFM height value, an OFM width value, a kernel height value, and a kernel width value;
generate the first control signals at times based on the OFM height value and the kernel height value;
generate the second control signals at times based on the OFM width value and the kernel width value; and
an address generation circuit including a multiplier circuit and a seventh adder circuit and coupled to the buffer circuit, the height traversal circuit, and the width traversal circuit, the address generation circuit configured to:
generate a sequence of addresses based on the multiplier circuit multiplying the height traversal values by an IFM width value and the seventh adder circuit adding output of the multiplier circuit to the width traversal values;
wherein the sequence of addresses is out of sequential order;
provide the sequence of addresses to the buffer circuit; and
enable reading from the buffer circuit.

2. The circuit arrangement of claim 1, wherein the height traversal circuit is configured to:
receive a pad height value; and
generate the sequence of height traversal values based on the pad height value.

3. The circuit arrangement of claim 1, wherein the width traversal circuit is configured to:
receive a pad width value; and
generate the sequence of width traversal values based on the pad width value.

4. The circuit arrangement of claim 1, further comprising:
a boundary check circuit coupled to the height traversal circuit, the width traversal circuit, and the address generation circuit, wherein the boundary check circuit is configured to generate a third control signal having a state indicating whether each height traversal value of the sequence of height traversal values is less than a height of the IFM and whether each width traversal value of the sequence of width traversal values is less than a width of the IFM; and
wherein the address generation circuit is configured to output an out-of-bounds address in response to the state of the third control signal indicating either an height traversal value of the sequence of height traversal values being less than a height of the IFM or an width traversal value of the sequence of width traversal values being less than a width of the IFM.

5. The circuit arrangement of claim 1, further comprising an array of multiply-and-accumulate circuits coupled to the buffer circuit and configured to perform convolution operations on data stored in the buffer circuit according to the sequence of addresses.

6. A circuit arrangement, comprising:
a buffer circuit configured for storage of elements i and i+1, for a plurality of sequential values of i, an unrolled input feature map (IFM) in row major order as a one-dimensional array at a plurality of corresponding sequential addresses and addressed sequentially in the buffer circuit;
a first circuit configured to:
traverse by a first adder circuit, a first range of values associated with a height of an output feature map (OFM) in response to a first counter control signal;
shift a value of the first range by a stride;
traverse by a second adder circuit, a second range of values associated with a height of a kernel in response to a second counter control signal; and
sum the shifted value of the first range and a value of the second range by a third adder circuit to generate a height traversal location;
a second circuit configured to:
traverse by a fourth adder circuit, a third range of values associated with a width of the OFM in response to a third counter control signal;
shift a value of the third range by the stride;
traverse by a fifth adder circuit, a fourth range of values associated with a width of the kernel in response to a fourth counter control signal; and
sum the shifted value of the third range and a value of the fourth range by a sixth adder circuit to generate a width traversal location; and
a third circuit configured to:
sum by a seventh adder circuit, a product generated by a multiplier circuit from the height traversal location and a width of an input feature map (IFM), and the width traversal location to generate an address of data of the IFM for a convolution operation on the data and the kernel; and
output the address in response to:
the height traversal location being within a height of the IFM; and
the width traversal location being within the width of the IFM; and
wherein the third circuit generates a sequence of addresses that is out of sequential order.

7. The circuit arrangement of claim 6, further comprising an array of multiply-and-accumulate circuits configured to perform the convolution operation.

8. The circuit arrangement of claim 6, further comprising a control circuit including:
a first counter configured to:
count to the height of the OFM; and
output the first counter control signal based on a value of the count;
a second counter configured to:
count to the height of the kernel; and
output the second counter control signal based on a value of the count;
a third counter configured to:
count to the width of the OFM; and
output the third counter control signal based on a value of the count; and a fourth counter configured to:
  count to the width of the kernel; and
  output the fourth counter control signal based on a value of the count.

9. The circuit arrangement of claim 8, wherein:
the first, second, third, and fourth counters coupled to one another; and
an enable input of three of the counters receives a clear signal of a previous one of the counters so that a respective one of the counters counts up by one in response to a previous one of the counters resetting.

10. The circuit arrangement of claim 6, wherein the first circuit includes:
  a first register controlled by a first control signal and configured to store the first range of values associated with the height of the OFM;
  a shifter configured to shift a value of the first register by the stride;
  a second register controlled by a second control signal and configured to store the second range of values associated with the height of the kernel; and
  an adder configured to sum the shifted value of the first register and a value of the second register to generate the height traversal location.

11. The circuit arrangement of claim 6, wherein the second circuit includes:
  a first register controlled by a first control signal and configured to store the third range of values associated with the width of the OFM;
  a shifter configured to shift a value of the first register by the stride;
  a second register controlled by a second control signal and configured to store the fourth range of values associated with the width of the kernel; and
  an adder configured to sum the shifted value of the first register and a value of the second register to generate the width traversal location.

12. The circuit arrangement of claim 6, further comprising a fourth circuit including:
  a first set of comparators configured to determine whether the width traversal location is within the width of the IFM; and
  a second set of comparators configured to determine whether the height traversal location is within the height of the IFM.

13. The circuit arrangement of claim 6, wherein the first circuit is configured to:
  receive a pad height of the IFM; and
  traverse the second range of values from a negative value of the pad height to the height of the kernel minus the pad height.

14. The circuit arrangement of claim 6, wherein the second circuit is configured to:
  receive a pad width of the IFM; and
  traverse the third range of values from a negative value of the pad width to the width of the kernel minus the pad width.

15. A method, comprising:
  inputting, to a control circuit, an output feature map (OFM) height value, an OFM width value, a kernel height value, and a kernel width value;
  generating, by the control circuit, first control signals at times based on the OFM height value and the kernel height value;
  generating, by the control circuit, second control signals at times based on the OFM width value and the kernel width value;
  generating, by a height traversal circuit, a sequence of height traversal values in response to the first control signals, the generating the sequence of height traversal values including incrementing an OFM height counter value by a first adder circuit, incrementing a height offset value by a second adder circuit, and generating a sequence of height traversal values based on the OFM height counter value and the height offset value by a third adder circuit;
  generating, by a width traversal circuit, a sequence of width traversal values in response to the second control signals, the generating the sequence of width traversal values including increment an OFM width counter value by a fourth adder circuit, incrementing a width offset value by a fifth adder circuit, and generating a sequence of width traversal values based on the OFM width counter value and the width offset value by a sixth adder circuit;
  generating, by an address generation circuit, a sequence of addresses based on a multiplier circuit multiplying the sequence of height traversal values by an IFM width value and an adder circuit adding output of the multiplier circuit to the width traversal values;
  providing, by the address generation circuit, the sequence of addresses to a buffer circuit configured for storage of elements i and i+1, for a plurality of sequential values of i, of an unrolled IFM as a one-dimensional array in row-major or column major order at a plurality of corresponding sequential addresses and addressed sequentially in the buffer circuit, wherein the sequence of addresses is out of sequential order; and
  enabling, by the address generation circuit, reading from the buffer circuit.

16. The method of claim 15, wherein generating the sequence of height traversal values includes:
  receiving, by the height traversal circuit, a pad height value; and
  generating, by the height traversal circuit, the sequence of height traversal values based on the pad height value.

17. The method of claim 15, wherein generating the sequence of width traversal values includes:
  receiving, by the width traversal circuit, a pad width value; and
  generating, by the width traversal circuit, the sequence of height traversal values based on the pad width value.

18. The method of claim 15, further comprising:
  generating, by a boundary check circuit, a third control signal having a state indicating whether each height traversal value of the sequence of height traversal values is less than a height of the IFM and whether each width traversal value of the sequence of width traversal values is less than a width of the IFM; and
  outputting, by the address generation circuit, an out-of-bounds address in response to the state of the third control signal indicating either an height traversal value of the sequence of height traversal values being less than a height of the IFM or an width traversal value of the sequence of width traversal values being less than a width of the IFM.

19. The method of claim 15, further comprising performing, by an array of multiply-and-accumulate circuits, convolution operations on data stored in the buffer circuit according to the sequence of addresses.

20. The method of claim 15, wherein the inputting occurs at runtime of the controller.

* * * * *